Feb. 23, 1932.   H. R. LOOSLEY   1,846,219
BEVERAGE DISPENSING BOX
Filed March 22, 1930   2 Sheets-Sheet 1
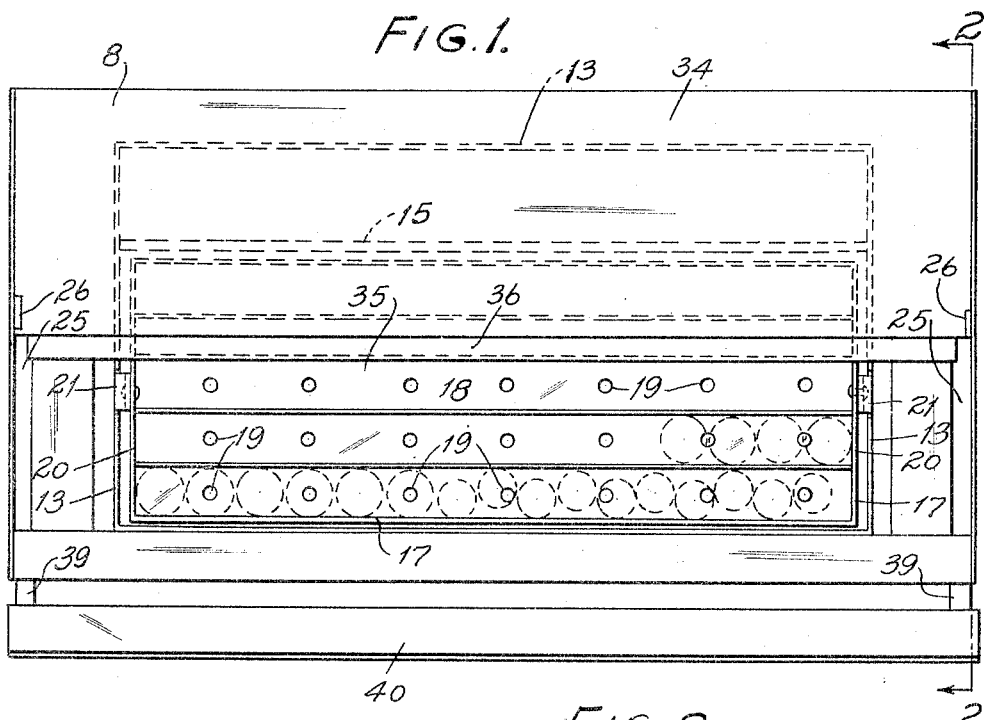
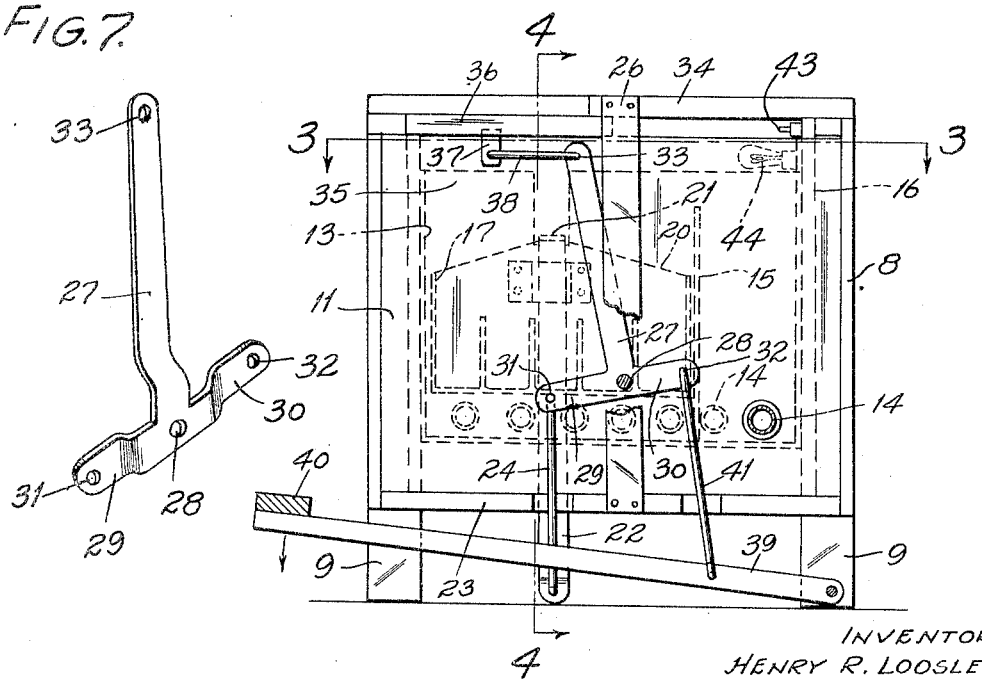
INVENTOR.
HENRY R. LOOSLEY.
By Edward E. Longan
ATTORNEY.

Feb. 23, 1932.　　H. R. LOOSLEY　　1,846,219
BEVERAGE DISPENSING BOX
Filed March 22, 1930　　2 Sheets-Sheet 2

INVENTOR:
HENRY R. LOOSLEY.
By Edward E. Logan
ATTORNEY.

Patented Feb. 23, 1932

1,846,219

UNITED STATES PATENT OFFICE

HENRY R. LOOSLEY, OF EAST ST. LOUIS, ILLINOIS

BEVERAGE DISPENSING BOX

Application filed March 22, 1930. Serial No. 437,967.

My invention relates to improvements in beverage dispensing boxes, and has for its primary object a beverage dispensing box in which bottled beverages are cooled to any predetermined temperature. The cooling agent may be either natural or artificial refrigeration.

A further object is to construct a beverage dispensing box which is provided with a slidable lid and in which other parts are so constructed that simultaneously with the opening of the lid, the various beverages will be partially raised out of the cooling element. In other words, my box is so constructed that by the depressing of a treadle, the bottled beverages will be partially raised out of the cooling element and the slidable lid opened, and upon release of the treadle, the bottles or bottled beverages will sink into the cooling fluid and the lid automatically close.

My device is arranged to take care of various sizes of bottled beverages which are usually termed as quarts and pints.

In the drawings:

Fig. 1 is a top plan view of my device with the lid open showing a portion of its interior;

Fig. 2 is a section taken on the line 2—2 of Fig. 1;

Fig. 7 is a perspective view of the operating lever employed in placing the various parts in movement.

Figure 4:
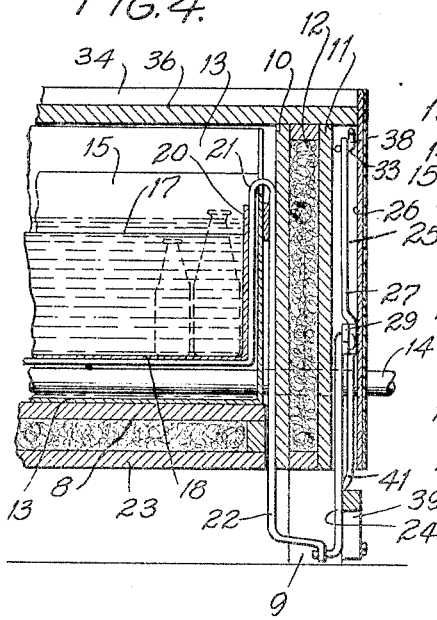
Fig. 4 is a fragmental vertical section taken on the line 4—4 of Fig. 2, showing the tray in lowered position.
Figure 3:
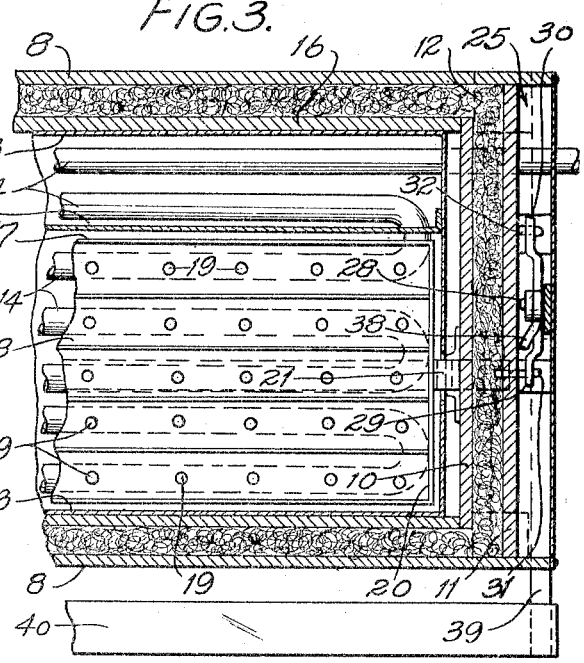
Fig. 3 is a fragmental plan view in section taken on the line 3—3 of Fig. 2.

In the construction of my device I employ a casing 8 which is provided with legs or supports 9. These legs or supports may be of any desired shape or construction. The casing 8 is provided with an inner wall 10 and with a wall 11 spaced apart therefrom, and between these walls I provide insulated material 12. A metallic lining 13 is provided for the casing which is designed to contain the cooling liquid, this liquid preferably being a non-freezing solution. The liquid may be cooled by means of refrigerating coils 14, the refrigerant of these coils being furnished by any of the standard devices of artificial refrigeration now commonly in use. The metallic lining 13 is also provided with an upstanding wall 15 which is adjacent the rear wall 16 of the casing 8. The purpose of this wall 15 and the space between it and the wall 16 will be explained in detail later.

Located within the casing and within the metallic lining 13 is a tray 17. This tray is provided with a bottom 18 which is apertured or otherwise provided with openings as indicated by the numeral 19, so that the cooling fluid can readily enter the tray. The tray is provided with side walls 20 to which the downturned ends 21 of bars 22 are secured. The bars 22 extend through the bottom 23 of the casing 8 and have attached thereto a link 24.

Figure 5:
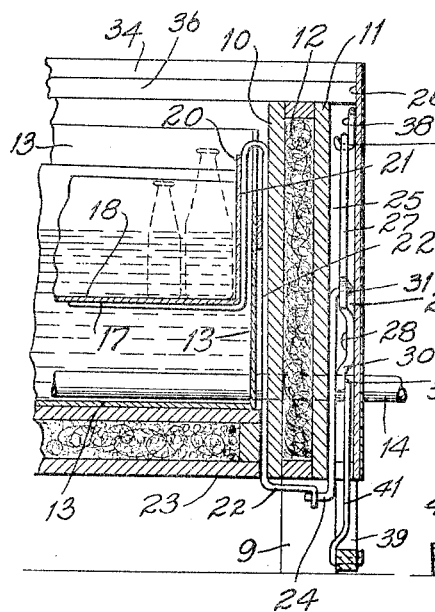
Fig. 5 is a similar view showing the tray in elevated position.

It will be noted from Figs. 4 and 5 that the top and bottom of the casing extends beyond the side edges or ends of the casing so as to provide a space 25. Secured to the top and bottom, and extending across the space 25, is a bar or support 26 to which is pivotally connected a T-shaped lever 27. This lever is pivotally mounted to the bar 26 at the point indicated by the numeral 28. The short arms 29 and 30 of the lever 27 are located at the lower end and are provided with openings 31 and 32 respectively, while the long arm of the lever 27 is provided with an opening 33.

The casing 8 is provided at its rear end with a permanent or immovable lid or cover 34, leaving the forward portion 35 open, which open portion is designed to be closed by a sliding lid 36. This sliding lid is provided on each of its sides with a dependent ear 37 into which one end of a link 38 is secured, the opposite end of this link being secured in the opening 33.

Carried by the rear legs or supports 9 are a pair of levers or arms 39 which, together with the member 40, form a treadle. The arms 39 each carry a link 41 which is secured at one end thereto, the opposite end of the link being secured in the opening 32, so that upon movement of the treadle mechanism just described, a pull will be exerted on the arm 30 of the lever 27.

Figure 6:
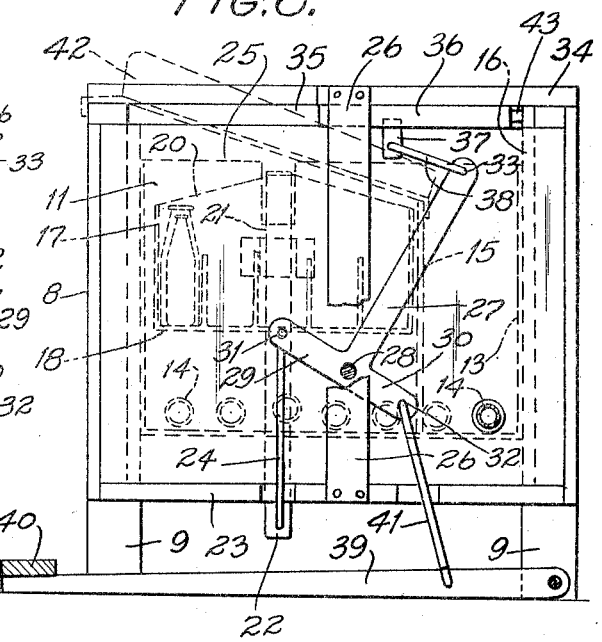
Fig. 6 is a view similar to Fig. 2 showing my device with the tray elevated and the lid opened, and disclosing means whereby the box can be charged with natural refrigeration.

In case the artificial refrigeration, such as furnished by the ordinary or usual type of cooling systems should fail, due to any reason whatsoever, I have provided what may be termed a chute 42 which is adapted to be placed in position as illustrated in Fig. 6, so that ice can be supplied to the cooling fluid to the rear of the wall 15 and thereby keep the beverages cool.

This device is an improvement on application filed by me in the United States, bearing Serial No. 311,740, October 11, 1928, and Patent No. 1,692,672 issued November 20, 1928.

It will be noted particularly that with my present device the same can be readily placed underneath any counter, and by the mere pressure of a foot the complete tray filled with beverage bottles can be elevated and the lid simultaneously moved and opened; and upon release of the treadle the bottles will automatically be lowered into the cooling fluid.

A particular advantage of my device is, that by elevating the bottles containing the beverages which are immersed in a liquid instead of in cracked ice, there is no danger of the dispenser cutting his hands, because it frequently happens that when warm beverages are suddenly immersed in a cooling fluid, the bottle will explode, leaving jagged edges and if the dispenser must reach into water or among cracked ice, he cannot discover such splinters, and frequently cuts his hand very seriously; in fact, where bottles are stored in cracked ice it is almost impossible to remove any such glass splinters because of their resemblance to the ice, and being practically invisible, but by my device, that is, raising the bottles bodily out of the cooling fluid, if a bottle should break it can be readily discovered and the dispenser will have no reason whatsoever to reach down into the fluid, my bottles being raised sufficiently high out of the cooling fluid to permit their ready removal.

Having fully described my invention, what I claim is:

1. A beverage dispensing box comprising a casing, a lid slidably carried by said casing, a cooling compartment in said casing, a tray in said compartment, a pair of bars extending upwardly into said casing each having its upper end bent downwardly and secured to said tray, a T shaped lever pivotally secured to each side of said casing, a link connecting one arm of each of said levers and said lid, a link connecting one of said remaining arms of each lever to each of said bars, a treadle mechanism located below said casing, and a link connecting the remaining arm of each lever and said treadle mechanism whereby said tray is raised and the lid simultaneously moved into open position when said treadle mechanism is actuated.

2. A beverage dispensing box comprising a casing having a slidable lid, a cooling compartment in the casing, a tray in said compartment, a pair of bars extending upwardly into the casing each having its upward end bent downwardly and secured to said tray, a lever mechanism cooperable with each of said bars and adapted to raise said bars and elevate said tray, a treadle operably connected to said lever mechanism and means cooperable with said bars and lever mechanism for slidably moving said lid when said tray is elevated.

3. A beverage dispensing box comprising a casing having a slidable lid, a cooling compartment in said casing, a tray in said cooling compartment, a pair of bars extending upwardly into the casing each having its upward end bent downwardly and secured to said tray, a lever mechanism cooperable with each bar and adapted to raise said bars and elevate said tray, and a link cooperable with said lever mechanism for slidably moving said lid, and a treadle operably connected to said lever mechanism.

4. A beverage dispensing box comprising a casing, a cooling compartment, a vertically movable tray located in said compartment, a pair of bars extending upwardly into the casing outside of said cooling compartment each bar having its upward end bent downwardly and secured to said tray, a lever mechanism on said casing, links connecting said lever mechanism and said bars, a horizontally slidable lid carried by said casing, a connection with said lever mechanism and said lid whereby said lid is opened simultaneously with the lifting of said tray and the contents of the box are readily accessible to the dispenser, and foot operated means operably connected to said lever mechanism.

In testimony whereof I have affixed my signature.

HENRY R. LOOSLEY.